(12) United States Patent
Nakamura

(10) Patent No.: US 11,556,011 B2
(45) Date of Patent: Jan. 17, 2023

(54) IMAGE DISPLAY SYSTEM

(71) Applicant: SUNCORPORATION, Konan (JP)

(72) Inventor: Yasuhiro Nakamura, Konan (JP)

(73) Assignee: SUNCORPORATION, Konan (JP)

( * ) Notice: Subject to any disclaimer, the term of this patent is extended or adjusted under 35 U.S.C. 154(b) by 600 days.

(21) Appl. No.: 16/336,575

(22) PCT Filed: Sep. 8, 2017

(86) PCT No.: PCT/JP2017/032570
§ 371 (c)(1),
(2) Date: Mar. 26, 2019

(87) PCT Pub. No.: WO2018/061718
PCT Pub. Date: Apr. 5, 2018

(65) Prior Publication Data
US 2020/0249485 A1     Aug. 6, 2020

(30) Foreign Application Priority Data
Sep. 27, 2016  (JP) .............................. JP2016-188713

(51) Int. Cl.
*G02B 27/01* (2006.01)
*G02C 5/00* (2006.01)
(Continued)

(52) U.S. Cl.
CPC ..... *G02B 27/0176* (2013.01); *G02B 27/0172* (2013.01); *G02C 3/003* (2013.01);
(Continued)

(58) Field of Classification Search
CPC .............. G02B 27/017; G02B 27/0172; G02B 27/0176; G02B 2027/0138;
(Continued)

(56) References Cited

U.S. PATENT DOCUMENTS

| 5,003,300 A | 3/1991 | Wells |
| 9,557,566 B2 | 1/2017 | Fujimaki |
| (Continued) | | |

FOREIGN PATENT DOCUMENTS

| CN | 103309034 A | 9/2013 |
| CN | 104808341 A | 7/2015 |
| (Continued) | | |

OTHER PUBLICATIONS

Japanese Office Action dated Mar. 30, 2021, together with English translation, for Japanese Application No. 2020-172739.
(Continued)

*Primary Examiner* — Alexander Eisen
*Assistant Examiner* — Cory A Almeida
(74) *Attorney, Agent, or Firm* — K&L Gates LLP

(57) ABSTRACT

An image display system may include an image display device, and first and second attachments. The image display device may include a frame wearable on a user's face, a display unit, display controlling unit causing the display unit to display an image, and a joint portion provided on the frame, capable of having the first attachment mounted thereon, capable of having the second attachment mounted thereon, and capable of selectively having one of the first and second attachments mounted thereon when the image display device is used. The first attachment may include an engaging portion capable of engaging with a use's head and a first attaching portion that attaches the engaging portion to the joint portion. The second attachment may include a fixing portion fixable to headwear covering the user's head and a second attaching portion that attaches the fixing portion to the joint portion.

7 Claims, 4 Drawing Sheets

(51) Int. Cl.
 *G02C 3/00* (2006.01)
 *G06F 3/147* (2006.01)
(52) U.S. Cl.
 CPC .......... *G02C 5/00* (2013.01); *G02B 2027/014* (2013.01); *G02B 2027/0138* (2013.01); *G02B 2027/0154* (2013.01); *G02B 2027/0178* (2013.01); *G02B 2027/0181* (2013.01); *G06F 3/147* (2013.01)
(58) Field of Classification Search
 CPC ...... G02B 2027/014; G02B 2027/0154; G02B 2027/0178; G02B 2027/0181; G02C 3/003; G02C 5/00; G06F 3/147
 See application file for complete search history.

(56) References Cited

U.S. PATENT DOCUMENTS

| | | | |
|---|---|---|---|
| 9,746,914 | B2 | 8/2017 | Aonuma et al. |
| 2009/0040296 | A1 | 2/2009 | Moscato |
| 2012/0069445 | A1 | 3/2012 | Kobayashi |
| 2013/0222213 | A1* | 8/2013 | Abdollahi .......... G02B 27/0176 345/8 |
| 2013/0234914 | A1 | 9/2013 | Fujimaki |
| 2014/0125558 | A1 | 5/2014 | Miyajima et al. |
| 2015/0326762 | A1 | 11/2015 | Ju et al. |
| 2016/0140728 | A1 | 5/2016 | Aonuma et al. |
| 2018/0004282 | A1 | 1/2018 | Aonuma et al. |

FOREIGN PATENT DOCUMENTS

| | | |
|---|---|---|
| CN | 105607253 A | 5/2016 |
| JP | H08237575 A | 9/1996 |
| JP | 2012065242 A | 3/2012 |
| JP | 201344833 A | 3/2013 |
| JP | 2014003426 A | 1/2014 |
| JP | 2014093050 A | 5/2014 |

OTHER PUBLICATIONS

Written Opinion for Application No. PCT/JP2017/032570, dated Nov. 11, 2017 (5 pages).
Extended European Search Report for European Patent Application No. 17855676.7 dated May 11, 2020.
Chinese Office Action for corresponding Chinese Patent Application No. 201780059227.5, dated Jan. 6, 2021.
International Search Report for Application No. PCT/JP2017/032570, dated Nov. 11, 2017 (4 pages).
Written Opinion for Application No. PCT/JP2017/032570, dated Nov. 11, 2017 (4 pages).
Chinese Decision of Rejection for Chinese Application No. 20178005227.5, dated Jan. 25, 2022 (English translation).
Chinese Office Action for Chinese Application No. 20178005227.5, dated Aug. 30, 2021 (English translation).
Chinese Office Action dated Sep. 2, 2022, together with English translation, for corresponding Chinese Application No. 201780059227.5.
Chinese Office Action dated Oct. 25, 2022, together with English translation, for corresponding Chinese Application No. 201780059227.5.

\* cited by examiner

IMAGE DISPLAY SYSTEM

CROSS-REFERENCE TO RELATED APPLICATIONS

This application is a U.S. National Stage Entry under 35 U.S.C. § 371 of International Patent Application No. PCT/JP2017/032570, filed Sep. 8, 2017 which application claims priority under 35 U.S.C. 119(b) and 37 CFR 1.55 to Japanese Application No. 2016188713, filed Sep. 27, 2016, the entire disclosures of which are hereby incorporated by reference herein.

TECHNICAL FIELD

The technique disclosed herein relates to an image display system that comprises an image display device to be worn on a face of a user when used.

BACKGROUND ART

Japanese Patent Application Publication No. 2014-93050 (referred to as Patent Literature 1 hereinbelow) describes an image display device to be worn on a face of a user when used, for example. This image display device is provided with a frame wearable on a face of a user, a display unit configured to be arranged at positions facing right and left eyes of the user in a case where the frame is worn on the face of the user, and a display controlling unit configured to cause the display unit to display an image.

SUMMARY OF INVENTION

Technical Problem

Such type of image display device may be difficult to be worn and held stably on the user's face due to its weight, in some cases. Conventionally, such an image display device may be held on the user's face when used, by fixing the image display device to an engaging member wearable on a head of the user (e.g., a frame having a shape of looped headband, a frame having a shape of semicircular headband, etc.) or by fixing the image display device to a predetermined holder configured to cover a user's head such as headwear and having the user wear that holder on the head. However, a suitable holder may differ from user to user depending on their heads. The technique of Patent Literature 1 does not consider realizing various mounting ways for the image display device.

The disclosure herein discloses a technique capable of realizing various mounting ways for an image display device.

Solution to Technical Problem

An image display system disclosed herein may comprise an image display device, a first attachment, and a second attachment. The image display device may comprise: a frame wearable on a face of a user; a display unit configured to be arranged at least one of a position facing a right eye of the user and a position facing a left eye of the user in a case where the frame is worn on the face of the user; a display controlling unit configured to cause the display unit to display an image; and a joint portion provided on the frame, configured to be capable of having the first attachment mounted thereon, configured to be capable of having the second attachment mounted thereon, and configured to be capable of selectively having one of the first attachment and the second attachment mounted thereon when the image display device is used. The first attachment may comprise an engaging portion configured to be capable of engaging with a head of the user and a first attaching portion configured to attach the engaging portion to the joint portion. The second attachment may comprise a fixing portion configured to be fixable to headwear covering the head of the user and a second attaching portion configured to attach the fixing portion to the joint portion.

Here, "first attachment" includes any attachment engageable with a head such as an engaging attachment having a shape of semicircular headband, an engaging attachment having a shape of looped headband, and the like. Further, "second attachment" includes any attachment fixable to any headwear configured to cover a head such as a cap, a helmet, and the like. Further, it can be said that "cause the display unit to display an image" is achieved so long as the user wearing the image display device can see the image when looking at the display unit. That is, it encompasses a case where the display unit includes a configuration that only reflects light which was radiated thereto and the user can perceive the image by seeing the reflected light reflected by the display unit (i.e., by receiving the reflected light on the user's retina).

In the above image display system, the frame of the image display device is provided with the joint portion that is configured to be capable of having the first attachment mounted thereon, configured to be capable of having the second attachment mounted thereon, and configured to be capable of selectively having one of the first attachment and the second attachment mounted thereon when the image display device is used. Therefore, when the image display system is used, the image display system can be used in a state where one of the first attachment and the second attachment is selectively mounted on the frame. Each user can select which of the first attachment and the second attachment is to be mounted when using the image display system. Due to this, each user can select a suitable holder (i.e., the first attachment or the headwear) for the head. Therefore, in the above image display system, various mounting ways for the image display device can be realized.

The joint portion may comprise a first adjustment mechanism configured to be capable of relatively changing mounting positions of the first attachment and the second attachment with respect to the frame.

According to this configuration, the user can adjust the mounting positions of the first attachment and the second attachment with respect to the frame, that is, a position of the first attachment when it engages with the head and a position of the headwear when it covers the head. Due to this, the image display device can be held more appropriately while being worn on the user's face.

The engaging portion may comprise a second adjustment mechanism configured to be capable of relatively changing an engaging position with respect to the head.

According to this configuration, the user can engage the first attachment with the head at an appropriate position.

The second attachment may comprise a third adjustment mechanism configured to be capable of relatively changing an arranging position of the fixing portion with respect to the second attaching portion.

According to this configuration, the user can appropriately adjust a positional relationship between the headwear fixed at the fixing portion and the image display device.

The fixing portion and the second attaching portion may be configured to be detachable from each other.

According to this configuration, the user can separate the frame from the headwear by detaching the fixing portion from the second attaching portion, without detaching the fixing portion from the headwear.

The image display system may further comprise a cover for covering an outside of the display unit.

According to this configuration, the display unit can be protected from drop impact and the like by the cover covering the outside of the display unit.

The display unit may be a transparent display that allows the user to see surroundings through the display unit in the case where the frame is worn on the face of the user. The cover may be a transparent covering member.

According to this configuration, when the user wears the frame on the face, the user can see the surroundings through the display unit and the cover.

DESCRIPTION OF EMBODIMENT

Embodiment

Figure 1:
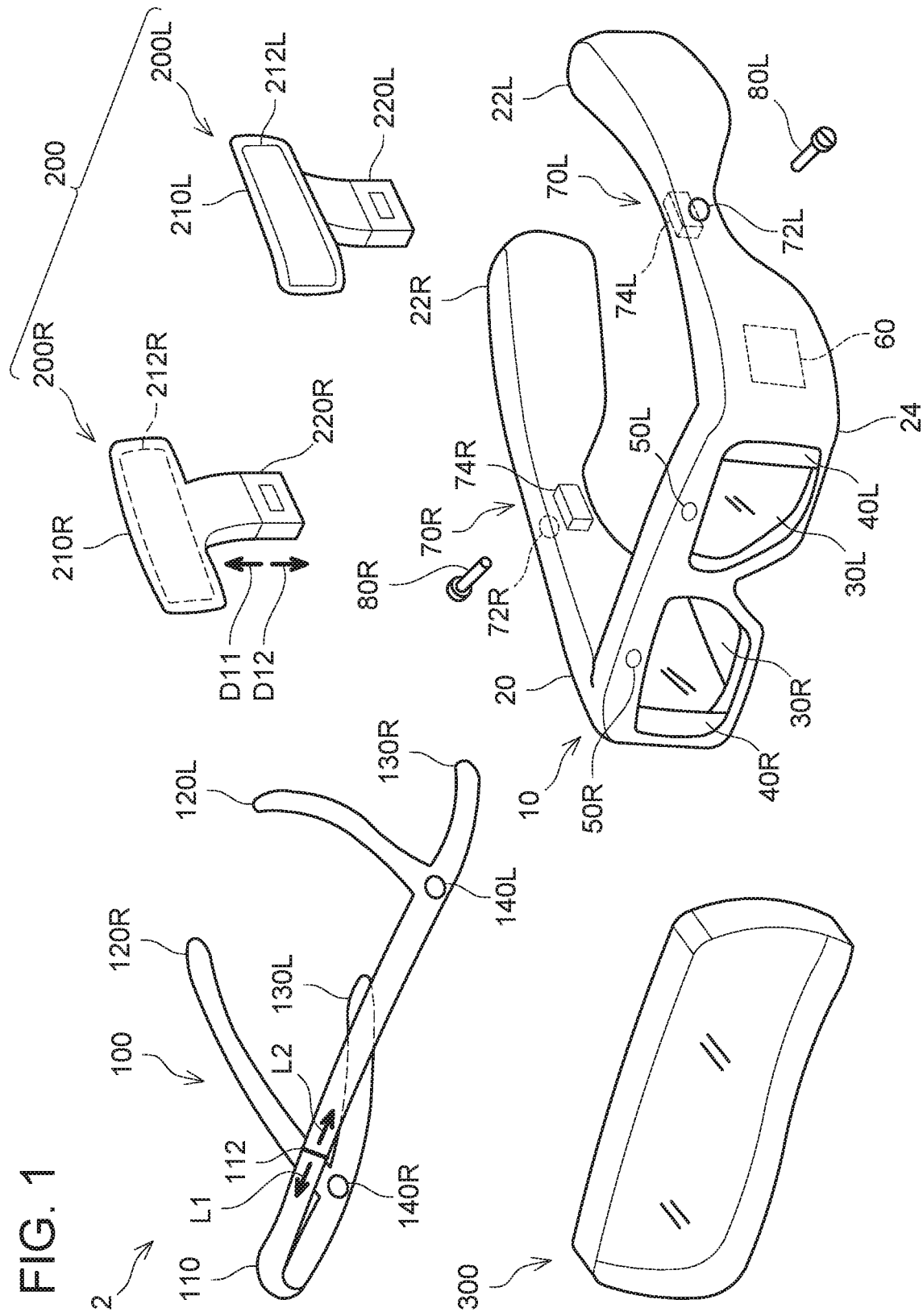
FIG. 1 shows an overview of an image display system 2.

Configuration of Image Display System 2; FIG. 1

As shown in FIG. 1, an image display system 2 includes an image display device 10, a first attachment 100, a second attachment 200, and a cover 300. In the image display system 2, the image display device 10 is a main entity of the system, and the first attachment 100, the second attachment 200 and the cover 300 are accessories of the image display device 10.

Configuration of Image Display Device 10; FIG. 1

The image display device 10 is an image display device that is to be worn on a face of a user when used (a so-called head-mounted display). As shown in FIG. 1, the image display device 10 includes a frame 20, a right display unit 30R, a left display unit 30L, a right projection unit 40R, a left projection unit 40L, a right camera 50R, a left camera 50L, a controller 60, a right joint portion 70R, and a left joint portion 70L.

The frame 20 is a member having a shape of glasses frame. The frame 20 is constituted of a front portion 24, a right temple portion 22R, and a left temple portion 22L. The front portion 24 faces a front of the user's face when the frame 20 is worn. The right temple portion 22R and the left temple portion 22L are respectively arranged at sides of the user when the frame 20 is worn and are supported by ears of the user.

Each of the right display unit 30R and the left display unit 30L is a transparent display member. The right display unit 30R and the left display unit 30L are both arranged in the front portion 24. When the user wears the image display device 10 on the face, the right display unit 30R is arranged at a position facing a right eye of the user, and the left display unit 30L is arranged at a position facing a left eye of the user. Hereinbelow, the right display unit 30R and the left display unit 30L may be collectively termed "display units 30".

The right projection unit 40R and the left projection unit 40L are members configured to project an image on the right display unit 30R and the left display unit 30L, respectively. The right projection unit 40R and the left projection unit 40L are provided at side portions of the right display unit 30R and the left display unit 30L, respectively. The right projection unit 40R and the left projection unit 40L are each configured to project a predetermined virtual image (which will be termed "object image" hereinbelow) on the display units 30 in accordance with instructions from the controller 60. Due to this, the user can see the object image together with a real-world object or/and space, which the user can see through the display units 30, as if the object image is superimposed at predetermined positions) of the real-world object or/and space.

The right camera 50R is arranged at a position above the right display unit 30R (i.e., at a position above the user's right eye) in the front portion 24 of the frame 20. On the other hand, the left camera 50L is arranged at a position above the left display unit 30L (i.e., at a position above the user's left eye) in the front portion 24. The right camera 50R and the left camera 50L are configured to be capable of capturing a range, which corresponds to a range of vision of the user wearing the image display device 10, from different angles.

The controller 60 is a built-in control device in a part of the frame 20. The controller 60 includes elements for controlling a control system of the image display device 10.

Each of the right joint portion 70R and the left joint portion 70L is a member configured to have the first attachment 100 and the second attachment mounted on the frame 20. Hereinbelow, the right joint portion 70R and the left joint portion 70L may be collectively termed "joint portions 70". The right joint portion 70R is provided in the right temple portion 22R, and the left joint portion 70L is provided in the left temple portion 22L. The right joint portion 70R is provided with a screw hole 72R and a joint 74R. The screw hole 72R is provided in a part of the right temple portion 22R. The joint 74R is arranged in a part of an inner side of the right temple portion 22R. A screw 80R (see FIG. 1) can be screwed into the screw hole 72R and the joint 74R. As will be described later, the screw 80R is screwed into the screw hole 72R and the joint 74R in a state where the joint 74R is aligned with an attachment hole 140R of the first attachment 100, by which the first attachment 100 can be mounted on the frame 20. Further, the screw 80R is screwed into the screw hole 72R and the joint 74R in a state where the joint 74R is aligned with an attaching portion 220R of the second attachment 200, by which the second attachment 200 can be mounted on the frame 20. That is, the joint portions 70 can have the first attachment 100 and the second attachment 200 selectively (i.e., one of the attachments) mounted thereon when the image display device 10 is used. Similarly to the right joint portion 70R, the left joint portion 70L is also provided with a screw hole 72L and a joint 74L, and a screw 80L (see FIG. 1) can be screwed into the screw hole 72L and the joint 74L.

The user can wear the image display device 10 on the face and use it, by arranging the front portion 24 at the positions facing the right eye and the left eye and further arranging the right temple portion 22R and the left temple portion 22L to extend respectively along the right side and the left side of the head (in a variant, the user may wear the image display device by having the right temple portion 22R and the left temple portion 22L supported respectively by the right ear and the left ear). At this occasion, the user can wear the image display device 10 by itself when using it, without using the accessories at least one of the first attachment 100, the second attachment 200, and the cover 300).

Figure 2:
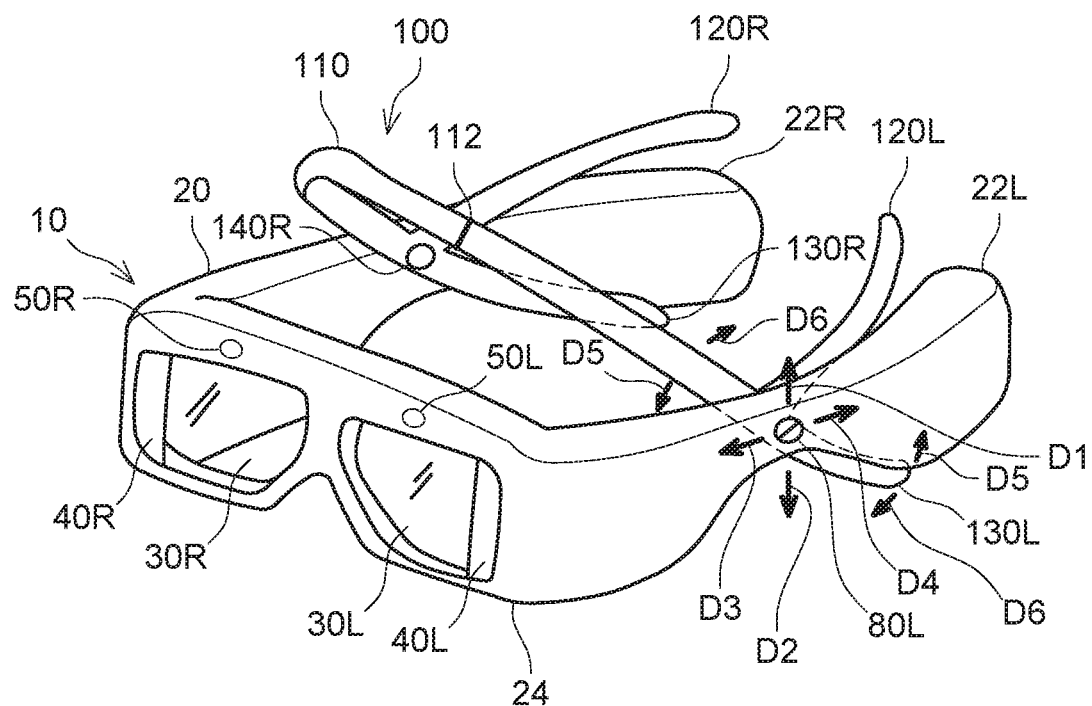
FIG. 2 shows a state where a first attachment 100 is mounted on an image display device 10.
Figure 3:
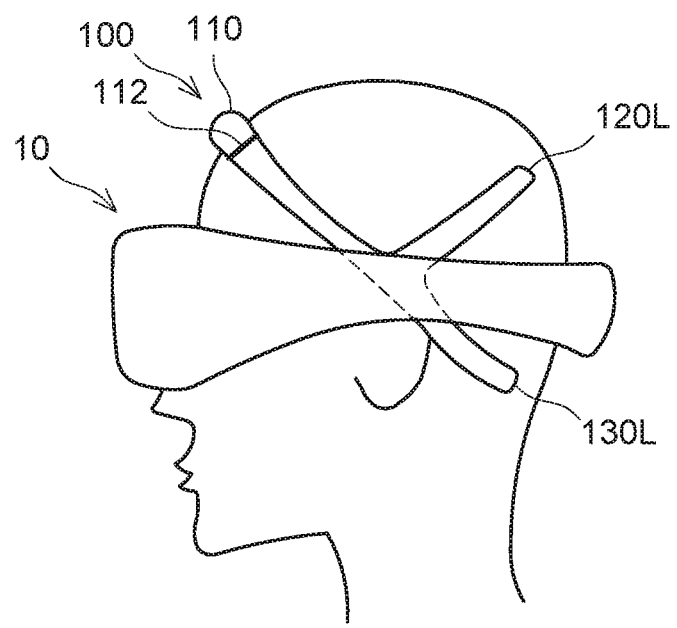
FIG. 3 shows a state where a user wears the image display device 10 of FIG. 2.

Configuration of First Attachment 100; FIGS. 1 to 3

The first attachment 100 shown in FIG. 1 is an accessory of the image display device 10 and is an attachment that can be used by being mounted on the frame 20 of the image display device 10. It should be noted that the first attachment 100 cannot be mounted on the frame 20 when the second attachment 200 is mounted on the frame 20. The first attachment 100 includes a frontal head engaging frame 110 that has a shape of semicircular headband, rear head engaging frames 120R, 120L, 130R and 130L that are configured integrally with the frontal head engaging frame 110, and attachment holes 140R and 140L.

The frontal head engaging frame 110 can engage with a frontal head of the user. The frontal head engaging frame 110 includes a length adjustment mechanism 112. The length adjustment mechanism 112 can adjust a length of the frontal head engaging frame 110 as shown by arrows L1, L2 in FIG. 1. Due to this, the user can engage the first attachment 100 with the head at an appropriate position.

Each of the rear head engaging frames 120R, 120L, 130R, 130L can engage with a rear head of the user. The attachment holes 140R, 140L are through holes provided between the frontal head engaging frame 110 and the rear head engaging frames 120R, 120L, 130R, 130L.

As shown in FIG. 2, the first attachment 100 can be mounted on the frame 20 of the image display device 10 by screwing the screw 80R into the screw hole 72R and the joint 74R in the state where the joint 74R is aligned with the attachment hole 140R and further by screwing the screw 80L into the screw hole 72L and the joint 74L in the state where the joint 74L is aligned with the attachment hole 140L.

At this occasion, the joints 74R, 74L of the frame 20 can relatively change a mounting position of the first attachment 100 with respect to the frame 20 by changing alignment positions with the attachment holes 140R, 140L (i.e., screwed positions by the screws 80R, 80L). Specifically, as shown by arrows D1, D2, D3, D4 in FIG. 2, the mounting position of the first attachment 100 with respect to the frame 20 can be changed in up-down directions and in front-rear directions. Further, as shown by arrows D5, D6 in FIG. 2, the mounting position of the first attachment 100 with respect to the frame 20 can be changed also by rotating the first attachment 100 about the attachment holes 140R, 140L (i.e., the screws 80R, 80L) in the front-rear directions. Due to this, a position of the first attachment 100 when it engages with the user's head can be adjusted. Thus, the image display device 10 can be worn and held stably on the user's face.

As shown in FIG. 3, the user can wear, on the head and the face, the image display device 10 on which the first attachment 100 has been mounted. At this occasion, the frontal head engaging frame 110 of the first attachment 100 engages with the frontal head of the user. The rear head engaging frames 120R, 120L, 130R, 130L engage with the rear head of the user. As such, by having the first attachment 100 engaged with the user's head, the image display device 10 can be worn and held stably on the user's face.

Figure 4:
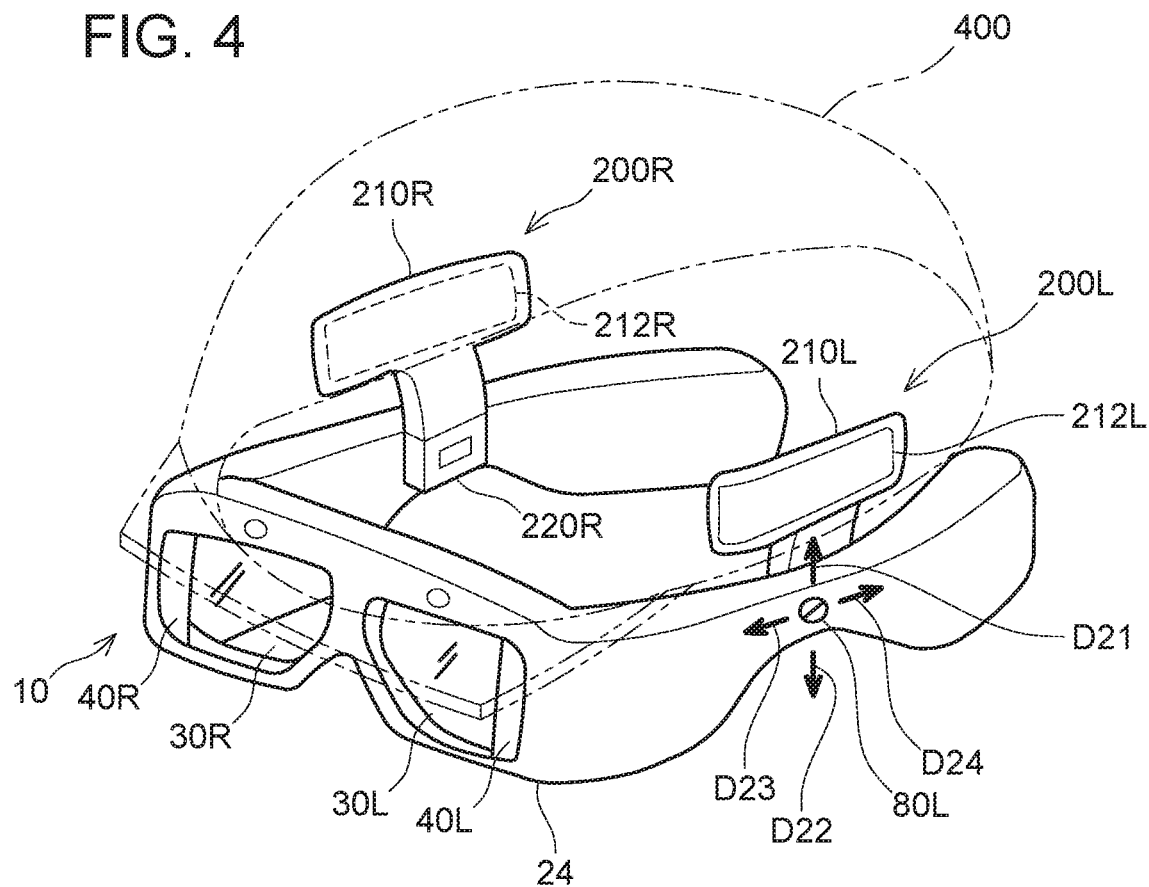
FIG. 4 shows a state where a second attachment 200 and a helmet 400 are mounted on the image display device 10.
Figure 5:
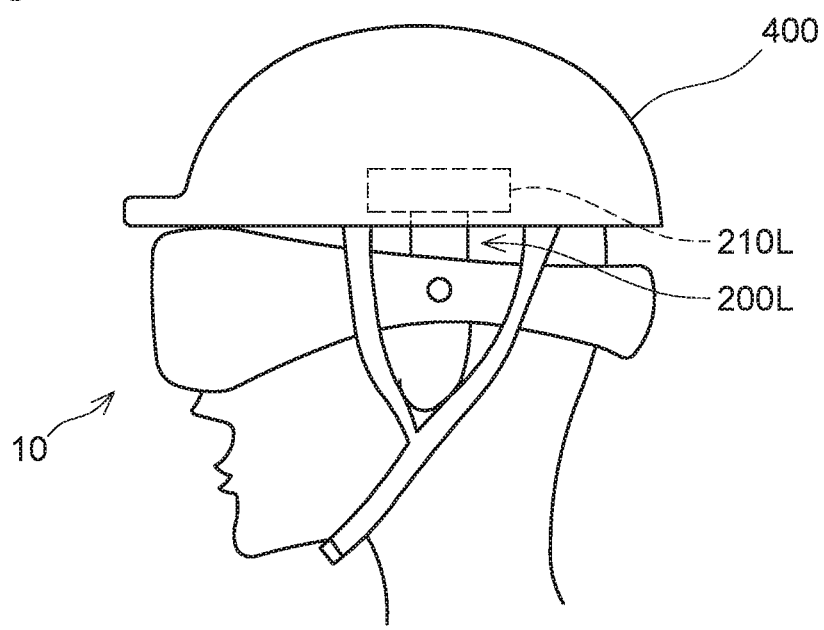
FIG. 5 shows a state where the user wears the image display device 10 of FIG. 4.

Configuration of Second Attachment 200; FIGS. 1, 4 and 5

The second attachment 200 shown in FIG. 1 is an accessory of the image display device 10 and is an attachment that can be used by being mounted on the frame 20 of the image display device 10. It should be noted that the second attachment 200 cannot be mounted on the frame 20 when the first attachment 100 is mounted on the frame 20. The second attachment 200 includes a right attachment 200R and a left attachment 200L.

The right attachment 200R includes a fixing portion 210R configured to be fixed to an inner side of headwear (e.g., a helmet 400 in FIG. 4) that covers the user's head, and the attaching portion 220R configured to attach the fixing portion 210R to the right joint portion 70R of the image display device 10.

The fixing portion 210R is a plate-shape member configured to be fixed to the inner side of the headwear (e.g., the helmet 400 in FIG. 4) with a fixing tape 212R. The fixing portion 210R and the attaching portion 220R are configured by different members from each other. As shown by arrows D11, D12 in FIG. 1, the fixing portion 210R can relatively change its arranging position with respect to the attaching portion 220R (i.e., can expand and shrink) in the up-down directions. Due to this, the user can appropriately adjust a positional relationship between the headwear fixed at the fixing portion 210R and the image display device 10. Further, the fixing portion 210R is detachable from the attaching portion 220R. The attaching portion 220R is a block-shape member that is detachable from the fixing portion 210R. As shown in FIG. 4, the attaching portion 220R can be fixed to the frame 20 by being screwed in a state of being aligned with the joint 74R.

The left attachment 200L also includes the similar configuration to that of the right attachment 200R. That is, the left attachment 200L also includes a fixing portion 210L and an attaching portion 220L. The fixing portion 210L has a fixing tape 212L attached thereto.

As shown in FIG. 4, the second attachment 200 (i.e., the right attachment 200R and the left attachment 200L) can be mounted on the frame 20 of the image display device 10 by screwing the screw 80R into the screw hole 72R and the joint 74R in the state where the joint 74R is aligned with the attaching portion 220R and further by screwing the screw SOL into the screw hole 72L and the joint 74L in the state where the joint 74L is aligned with the attaching portion 220L. Then, the fixing tape 212R attached to the fixing portion 210R and the fixing tape 212L attached to the fixing portion 210L are fixed to the inner side of the helmet 400. As such, the helmet 400 can be mounted on the image display device 10.

At this occasion, the joints 74R, 74L of the frame 20 can relatively change mounting positions of the second attachment 200 and the helmet 400 with respect to the frame 20 by changing alignment positions with the attaching portions 220R, 220L (i.e., the screwed positions by the screws 80R, 80L). Specifically, as shown by arrows D21, D22, D23, D24, the mounting positions of the second attachment 200 and the helmet 400 with respect to the frame 20 can be changed in the up-down directions and in the front-rear directions. Due to this, a position of the headwear when it covers the user's head can be adjusted. Thus, the image display device 10 can be worn and held stably on the user's face.

As shown in FIG. 5, the user can wear, on the head and the face, the image display device 10 on which the second attachment 200 and the helmet 400 have been mounted. That is, the user can wear the helmet 400 on the head and wear the image display device 10 on the face. As such, by the helmet 400 covering the user's head, the image display device 10 can be worn and held stably on the user's face.

Further, the user can detach the helmet 400 from the image display unit 10 by detaching the fixing portions 210R, 210L from the attaching portions 220R, 220L. That is, the user can separate the helmet 400 from the image display device 10 without detaching the attaching portions 220R, 220L from the frame 20.

Figure 6:
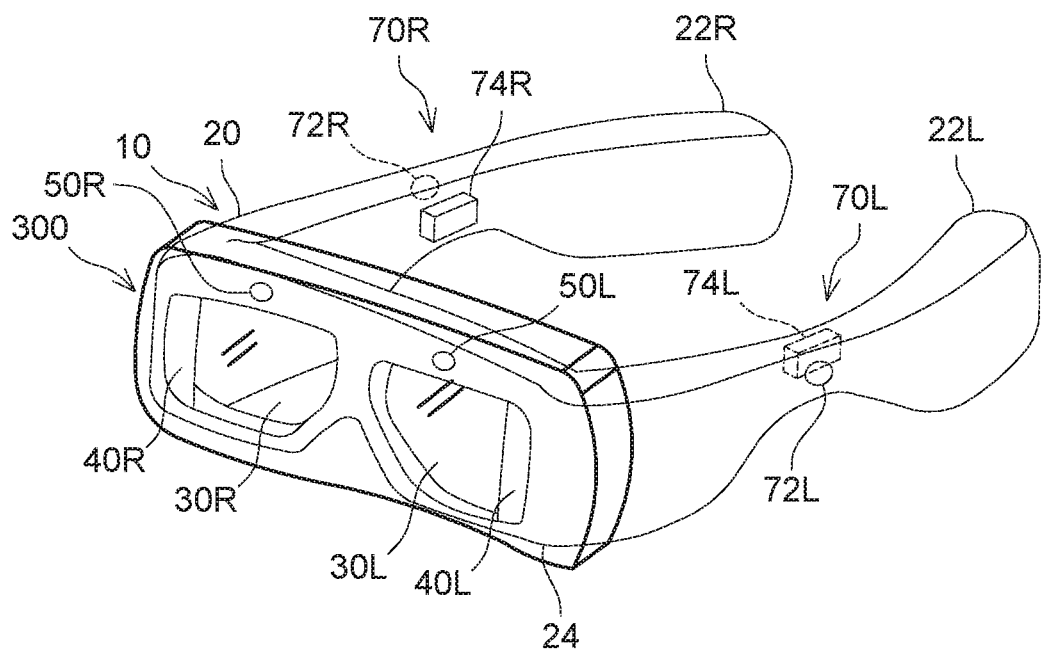
FIG. 6 shows a state where a cover 300 is mounted on the image display device 10.
Figure 7:
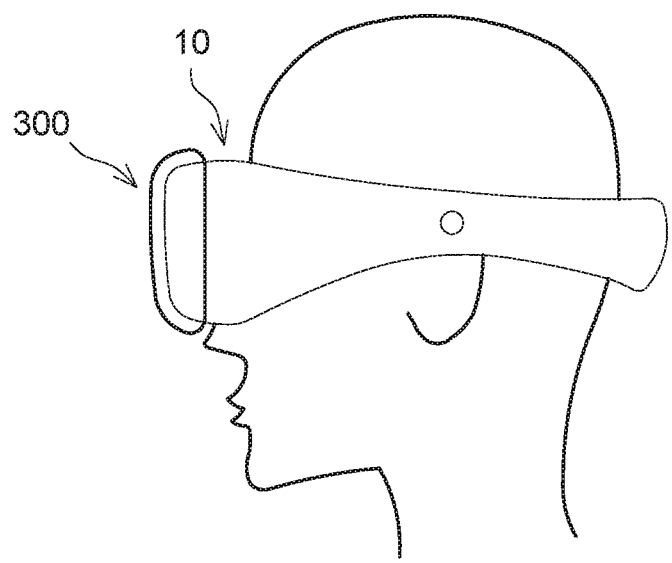
FIG. 7 shows a state where the user wears the image display device 10 of FIG. 6.

Configuration of Cover 300; FIGS. 1, 6 and 7

The cover 300 shown in FIG. 1 is a cover member configured to cover an outside of the display units 30. The cover 300 is constituted of a transparent and impact-resistant member polycarbonate). The cover 300 has a shape that covers a front surface of the front portion 24 of the frame 20.

As shown in FIG. 6, the cover 300 can be mounted on the image display device 10 by fitting the cover 300 to the front surface of the front portion 24. As such, the display units 30 are covered by the cover 300 and are thus protected from drop impact and the like. In the example of FIG. 6, the image display device 10 has only the cover 300 mounted thereon, however, the image display device 10 on which the cover 300 has been mounted can further have the first attachment 100 or the second attachment 200 mounted thereon and can be used in that state.

As shown in FIG. 7, the user can wear, on the face, the image display device 10 on which the cover 300 has been mounted. At this occasion, since the display units 30 and the cover 300 are transparent, the user can see the surroundings through the display units 30 and the cover 300.

The image display system 2 of the embodiment has been described above. As described above, in the embodiment, the frame 20 of the image display device 10 includes the joint portions 70 that are configured to be capable of having the first attachment 100 mounted thereon, having the second attachment 200 mounted thereon and selectively having one of the first attachment 100 and the second attachment 200 mounted there on when the image display device 10 is used. Due to this, when the image display system 2 is used, the image display system 2 can be used in the state where one of the first attachment 100 and the second attachment 200 (and the headwear) is selectively mounted on the frame 20. Each user can select which of the first attachment 100 and the second attachment 200 (and the headwear) is to be mounted when using the image display system 2. Thus, each user can select a suitable holder the first attachment 100 or the headwear) for its own head. Therefore, according to the image display system 2 of the embodiment, the image display device 10 can be worn and held stably on the user's face.

Correspondence Relationships

Correspondence relationships between the embodiment and the claims will be described. The attachment holes 140R, 140L are examples of "first attaching portion". The attaching portions 220R, 220L are examples of "second attaching portion". The mechanism provided at the joints 74R, 74L for adjusting the alignment positions with the attachment holes 140R, 140L and with the attaching portions 220R, 220L is an example of "first adjustment mechanism". The length adjustment mechanism 112 is an example of "second adjustment mechanism". The mechanism provided at the fixing portions 210R, 210L for relatively changing the arranging positions with respect to the attaching portions 220R, 220L is an example of "third adjustment mechanism".

While specific examples of the present disclosure have been described above in detail, these examples are merely illustrative and place no limitation on the scope of the patent claims. The technology described in the patent claims also encompasses various changes and modifications to the specific examples described above. For example, variants described below may be adopted.

Variant 1

In the above embodiment, the image display device 10 includes the right display unit 30R and the left display unit 30L that correspond respectively to both of the eyes. However, no limitation is placed thereon, and the image display device may include only one of the right display unit and the left display unit. Alternatively, the image display device may include only a single display unit corresponding to both of the eyes (i.e., capable of covering both of the eyes). That is, the image display device may include any display unit so long as it includes a display unit configured to be arranged at least one of a position facing the right eye of the user and a position facing the left eye of the user in a case where the frame is worn on the user's face.

Variant 2

In the above embodiment, the frame 20 is a member having the shape of glasses frame. However, no limitation is placed thereon, and the frame may have any shape, not limited to the shape of glasses frame, so long as it includes the joint portion configured to be capable of having the first attachment 100 and the second attachment 200 mounted thereto. For example, the frame may have a mask shape that covers the face.

Variant 3

In the above embodiment, the display units 30 are transparent display members. However, no limitation is placed thereon, and the display units may be non-transparent display members and may block the vision of the user when worn on the user's face. Further, in this case, the cover 300 may be constituted of a non-transparent member.

Variant 4

The headwear to which the second attachment 200 (more specifically, the fixing portions 210R, 210L) is fixed is not limited to the helmet 400 as shown in FIG. 4. The headwear to which the second attachment 200 is fixed may be a cap or the like, not limited to the helmet, so long as it is configured to be capable of covering the user's head.

Variant 5

The shape of the first attachment 100 is not limited to the shape of semicircular headband as shown in FIG. 1, and it may be any shape, such as a shape of looped headband, so long as it can engage with the user's head.

Variant 6

In the above embodiment, the right joint portion 70R and the left joint portion 70L have the first attachment 100 and the second attachment 200 mounted on the frame 20 by screwing them with the screw 80R and the screw 80L, respectively. However, the fixing method for the joint portions 70 and the first attachment 100 and the second attachment 200 is not limited to the screwing, and they may be fixed with any method. For example, the right joint portion 70R and the left joint portion 70L may have the first attachment 100 and the second attachment 200 mounted on the frame 20 by fitting parts of the first attachment 100 and parts of the second attachment 200 to the joint 74R and the joint 74L, respectively. In this case, the first attachment 100 may include a fit-in configuration to be fitted to the joints 74R, 74L, instead of the attachment holes 140R, 140L. Similarly, the attaching portions 220R, 220L of the second attachment 200 may also include a fit-in configuration to be fitted to the joints 74R, 74L.

Variant 7

Further, in the above embodiment, the joints 74R, 74L of the frame 20 can relatively change the mounting position of the first attachment 100 with respect to the frame 20 by changing the alignment positions with the attachment holes 140R, 140L (i.e., the screwed positions by the screws 80R, 80L). Similarly, the joints 74R, 74L can relatively change the mounting position of the second attachment 200 and the helmet 400 with respect to the frame 20 by changing the alignment positions with the attaching portions 220R, 220L (i.e., the screwed positions by the screws 80R, 80L). However, the method of changing the mounting positions of the first attachment 100 and the second attachment 200 with respect to the frame 20 is not limited to the changing of screwed positions, and may be any method. For example, a dial mechanism for position change may be provided, and the mounting positions of the first attachment 100 and the second attachment 200 with respect to the frame 20 may be changed by a dial portion of the dial mechanism being rotated.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:

1. An image display system comprising:
an image display device;
a first attachment; and
a second attachment,
wherein
the image display device comprises:
 a frame wearable on a face of a user;
 a display unit configured to be arranged at least one of a position facing a right eye of the user and a position facing a left eye of the user in a case where the frame is worn on the face of the user;
 a display controlling unit configured to cause the display unit to display an image; and
 a joint portion provided on the frame, configured to releasably attach the first attachment, configured to releasably attach the second attachment, and configured to selectively receive the first attachment or the second attachment,
the first attachment comprises a first portion configured to secure the first attachment to a head of the user and a second portion configured to attach the first portion to the joint portion, and
the second attachment comprises a third portion configured to attach to an external headwear covering the head of the user and a fourth portion configured to attach the third portion to the joint portion.

2. The image display system as in claim 1, wherein
the joint portion comprises a first adjustment mechanism configured to change mounting positions of the first attachment and the second attachment with respect to the frame.

3. The image display system as in claim 1, wherein
the first portion comprises a second adjustment mechanism configured to change an engaging position of the first portion with respect to the head.

4. The image display system as in claim 1, wherein
the second attachment comprises a third adjustment mechanism configured to change an arranging position of the third portion of the second attachment with respect to the fourth portion.

5. The image display system as in claim 1, wherein
the third portion and the fourth portion are detachable from each other.

6. The image display system as in claim 1, further comprising a cover for covering an outside of the display unit.

7. The image display system as in claim 6, wherein
the display unit is a transparent display configured to allow the user to see surroundings through the display unit when the frame is worn on the face of the user, and the cover is a transparent covering member.

* * * * *